June 24, 1958 C. S. WILLIAMS ET AL 2,840,761
HIGH-FREQUENCY WELDING STABILIZER
Filed May 5, 1954 3 Sheets-Sheet 1

WITNESSES

INVENTORS
Clifton S. Williams &
William E. Pakala.
BY
ATTORNEY

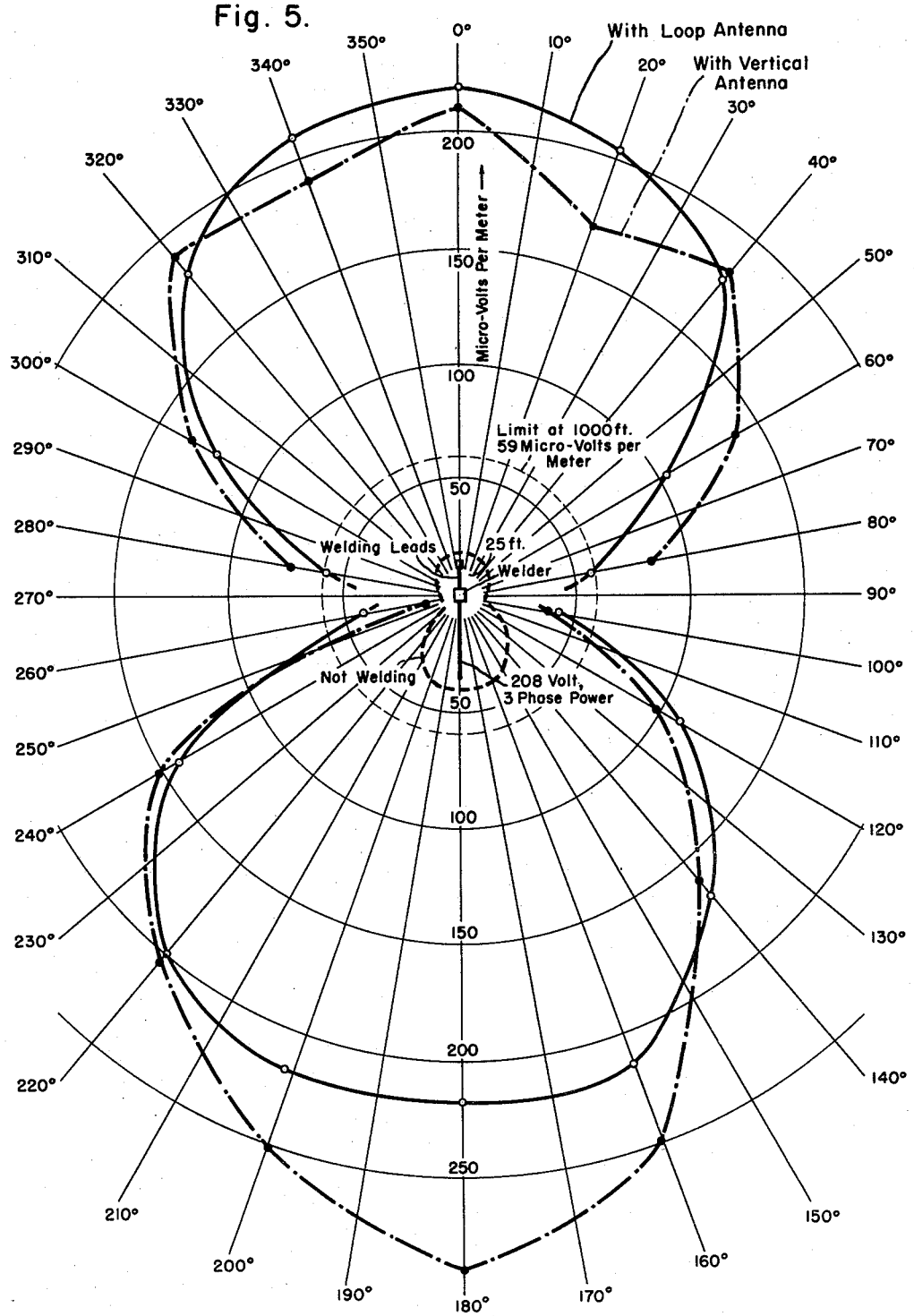

United States Patent Office 2,840,761
Patented June 24, 1958

2,840,761
HIGH-FREQUENCY WELDING STABILIZER

Clifton S. Williams and William E. Pakala, Pittsburgh, Pa., assignors to Westinghouse Electric Corporation, East Pittsburgh, Pa., a corporation of Pennsylvania Application May 5, 1954, Serial No. 427,738

9 Claims. (Cl. 315—163)

Our invention relates to electric discharge apparatus, and has particular relation to arc welding apparatus.

Arc welding apparatus fo certain types includes a so-called high-frequency stabilizer which impresses a high-frequency potential between the electrode and the work to facilitate the starting and the stabilizing of the arc. Such a stabilizer is particularly necessary in welders of the single-phase, alternating-current type in which the supply potential and the welding current reverses in polarity at the end of each half period of the supply. In such apparatus, the stabilizer performs a function of restarting the arc when the arc current passes through zero on reversal.

The high-frequency stabilizer used in arc welding, in accordance with the teachings of the prior art, is a spark gap oscillator. Such an oscillator when energized produces wave trains of damped radio-frequency oscillations accompanied by radiation which may interfere with authorized communication services such as broadcast receivers. During the past seven years, the Federal Communications Commission has promulgated an order that the arc welding industry either give up the use of the spark gap type stabilizer or develop a stabilizing oscillator which will meet limits set up by the Commission. A radiation limit of 10 microvolts per meter at a distance of one mile from the stabilizer has been established by the Commission. This is equivalent to a field strength of 59 microvolts per meter measured at any point on the periphery of a circle of 1000 feet radius having its center substantially at the arc welder.

In spite of this demand from the Federal Communications Commission, and in spite of its repeated assertions ultimately to permit the use only of stabilized arc welders meeting Commission limits, we have encountered no tangible evidence that the arc welding industry has produced a stabilized arc welder which meets the limits. When the Commission first promulgated its order about seven years ago, it set a date by which all the arc welders should meet the condition imposed and the arc welding industry started to develop a suitable arc welder. Prior to the expiration of the date, the industry reported that it had been unsuccessful and the new date was set. Since then the Commission has, at the request of the industry, repeatedly extended the date by which it would permit only welders meeting the condition, and between each new limiting date and the prior one, the welding industry devoted considerable time and effort to develop a suitable stabilizer arc welder, but was entirely unsuccessful.

It is, accordingly, an object of our invention to provide an arc welder including a high-frequency stabilizer, the radiation from which shall be within the limits prescribed by the Commission.

Another object of our invention is to provide for an arc welder a high-frequency stabilizer such that when the welder is in operation, the radiation measured on the periphery of a circle of a radius of 1,000 feet having its center substantially at the arc welder shall not exceed 59 microvolts per meter.

An incidental object of our invention is to provide a novel spark gap oscillator having a long life.

Our invention in its broader aspects arises from the realization that the radiation from a stabilized arc welder can be substantially reduced by reducing the high-frequency stabilizing current which flows between the electrode and the work and that the required reduction may be effected without deteriorating the effectiveness of the operation of the stabilizer. The latter condition arises from the fact that the effectiveness of the operation of the stabilizer is dependent on the open-circuit voltage impressed by the stabilizer between the electrode and the work, and this voltage may be maintained at the effective magnitude which is of the order of between 2,000 and 3,000 volts even with the high-frequency stabilizing current substantially reduced. We have further found that the high-frequency current can be substantially reduced without reducing the open-circuit voltage at the electrode and the work by providing a stabilizing oscillator having a high internal impedance.

The extent of the interference which is produced by an arc welder is obtained by measuring the electromagnetic radiation field on the specified periphery. This radiation field intensity is proportional to the first power of the radio-frequency current I flowing in the arc welder circuit. The radiation measured may be reduced in proportion to the extent to which the current is reduced.

Now a stabilized welder may be regarded as a circuit in which the oscillator source voltage is connected as a hypothetical impedanceless supply in series with the internal impedance of the oscillator, the welding leads, electrodes and the work. The radio-frequency current I, which would be produced in such a circuit, would be given by the equation $$I = \frac{e_o}{Z_o + Z_L}$$

where $e_o$ is the oscillator source potential, $Z_o$ the internal impedance of the oscillator and $Z_L$ the welding lead and load impedance. It is seen that the current I may be substantially reduced by increasing $Z_o$ without changing $e_o$. Established welding practices do not permit changing $Z_L$. Now under the open circuit conditions with the electrode separated from the work, the open-circuit magnitude of $e_o$ is not affected by the impedance $Z_o$ because no current flows. Thus, $Z_o$ may be increased without affecting the voltage available for arc initiation. When the above-described circuit is closed by an arc or by connecting the electrode and the work, $Z_o$ does affect the current flow, and if it is large may materially reduce the current I and thereby the radiation as previously explained.

In accordance with the broader aspects of our invention then, we provide stabilized arc welding apparatus in which the stabilizing oscillator has a high internal impedance and is still capable of supplying the 2,000 to 3,000 volts required for effective stabilization. The high internal impedance is achieved in accordance with the specific aspects of our invention by providing an oscillator having an output coil with a high inductance. In fact, we have found that the output coil should have an inductance of 3 or 4 times the inductance of prior art stabilizing oscillators. Thus, in a prior art stabilized arc welder which we have found not to meet the Federal Communications Commission requirements, the inductance of the output coil is of the order of 12 microhenries and in our corresponding oscillator, the output coil is of the order of 43 microhenries.

In a stabilized arc welder, the output coil of the stabilizing oscillator is usually connected in series with the electrode and the work, and the welding current flows through it. It is essential then that the coil have a low ohmic resistance to avoid losses. It is for this reason that the impedance is introduced as an inductive reactance, rather than resistance and reactance combined. In addition, to maintain the losses at a minimum, the coil should have turns of copper or aluminum wire of low ohmic resistance.

Further, since the output coil is connected in series with the electrode and the work, practical considerations impose a limit on the reactance which may be thus introduced. If the coil has too high a reactance, the power factor of the arc welder is materially decreased and its use becomes uneconomic.

With the practical limitations thus imposed on the internal reactive impedance of the oscillator, we have found that while the interference electric field is materially improved by increasing the oscillator internal inductance to the extent practicable, it is not in all situations sufficiently reduced to meet the limitations imposed by the Federal Communications Commission. In accordance with a further and more specific aspect of our invention, the field radiated from a stabilized arc welder in accordance with our invention is further reduced by reducing materially the Q of the oscillator. This reduction results in a broadening of the radiation band. Since the radiated energy is thus distributed over a broader band, the energy radiated at any frequency is materially reduced. In this case, again it is essential that the radiated energy be reduced without reducing the open-circuit voltage impressed by the oscillator between the electrode and the work, and this object is achieved by assuring that all the available voltage produced by the oscillator is impressed across the oscillating coil.

The reduction of the Q in accordance with our invention is accomplished by increasing the resistance in the oscillating circuit, and it is conceivable that this object can be accomplished simply by adding resistance in the primary circuit of the oscillator. But, we have found that if resistance having inductance, such as a tungsten lamp, is simply connected in series with the input oscillating coil, the loss of voltage in the lamp principally from the inductive reactance of the lamp is at the stabilizing frequency so large that the voltage available between the electrode and the work is inadequate to strike an arc. In accordance with our invention, the Q could be reduced by connecting an inductiveless resistance in series with the input coil of the oscillator, but we prefer to provide an oscillator in which the turns of the input coil are composed of a high resistance wire, such as Nichrome wire, and thus the resistance is present in the coil and does not add undesirable inductance which would reduce the oscillator potential available between the electrode and the work. Nichrome is the name of a well-know alloy including essentially nickel and chromium. A typical such alloy may include 15–16% chromium, 59–62% nickel, about 24% iron, and 0.1% carbon. (Handbook of Material Trade Names, Zimmerman and Lavine, 1953 edition, Industrial Research Services, Dover, N. H.) In this specification and in the claims, we shall on occasion refer to "Nichrome" wire. By this reference we means not only Nichrome wire itself, which is particularly suitable in the practice of our invention, but also its equivalents; that is, other suitable wires having a resistivity which is high compared to that of copper.

The increase in the inductive reactance of the output coil of the stabilizing oscillator is effected by increasing the number of turns of this coil. So that the stabilizing voltage impressed between the electrode and the work may remain adequate, the number of turns of the input coil must be correspondingly increased. Under such circumstances, the capacity in the resonant circuit, which determines the frequency of the oscillator, must be materially reduced to maintain the oscillations within the desired band of frequencies. But we have found that a stabilizing oscillator in which, as compared to similar prior art apparatus, the capacity is reduced and the inductance increased does not produce radio-frequency potential between the electrode and the work which is entirely reliable and is capable under all circumstances of causing an arc to strike.

It is, accordingly, an object of our invention to provide a stabilizing oscillator having a substantially higher inductance and a substantially lower capacity than prior art oscillators which shall operate reliably and effectively to stabilize a welding arc.

Our invention, in its specific aspects, involving the oscillator arises from the discovery that the capacitor being at substantially smaller capacity than in prior art apparatus, tends to charge at so high a rate during the intervals when the spark gaps are extinguished as not to afford sufficient time for the spark gaps to deionize. An oscillator with this lower capacity thus, on occasion, tends to oscillate in irregular spurts rather than continuously and does not produce a sufficient number of high-frequency trains per unit time to fire the arc reliably.

In accordance with this specific aspect of our invention, we suppress the tendency of the oscillator to operate irregularly by connecting in series with the resonant-circuit capacitor resistance adequate to permit the capacitor to charge at such a rate that the spark gap deionizes in the intervals between oscillatory trains. This feature of our invention has advantages in addition to lending the stabilizing oscillator reliability. We have found in using an oscillator embodying this feature of our invention over long time intervals that the temperature at which the spark gap terminals operate is substantially reduced, as compared to the temperature of operation of prior art stabilizing oscillators. The life of the spark gap terminals is thus materially increased and the stability of the operation of the spark gaps is materially improved.

Further, the magnitude of the resistance in series with the resonant-circuit capacitor determined the number of trains of radio-frequency oscillations produced per half period of the supply. It thus affords means for setting the number of wave trains at the most effective magnitude.

Still another unanticipated advantage of the resistor-capacitor circuit can be realized by comparing our oscillator with the prior art stabilizing oscillator. In the prior art stabilized oscillator, the spark gap is connected directly across the secondary of a high-voltage supply transformer. To limit the short-circuit current of the high-voltage transformer, when the spark gap is carrying current, the high-voltage transformer is in this oscillator of high impedance having a high leakage characteristic. This high impedance produces a substantial phase shift in the potential supplied to the resonant-network and the spark gap, and to compensate for this phase shift, resistance and capacity components are connected in the primary circuit of the high-voltage transformer. Since the resistance in the oscillator in accordance with our invention limits the current flow through the spark gap, the high-voltage transformer may be of the low impedance type and there is no necessity for phase correction.

The novel features that we consider characteristic of our invention are set forth generally above. The invention itself, both as to its organization and its method of operation, together with additional objects and advantages thereof, will be understood from the following description of a specific embodiment when read in connection with the accompanying drawings, in which:

Fig. 5 is a polar diagram plotted from data taken with an arc welder of the prior art type.

Figure 1:
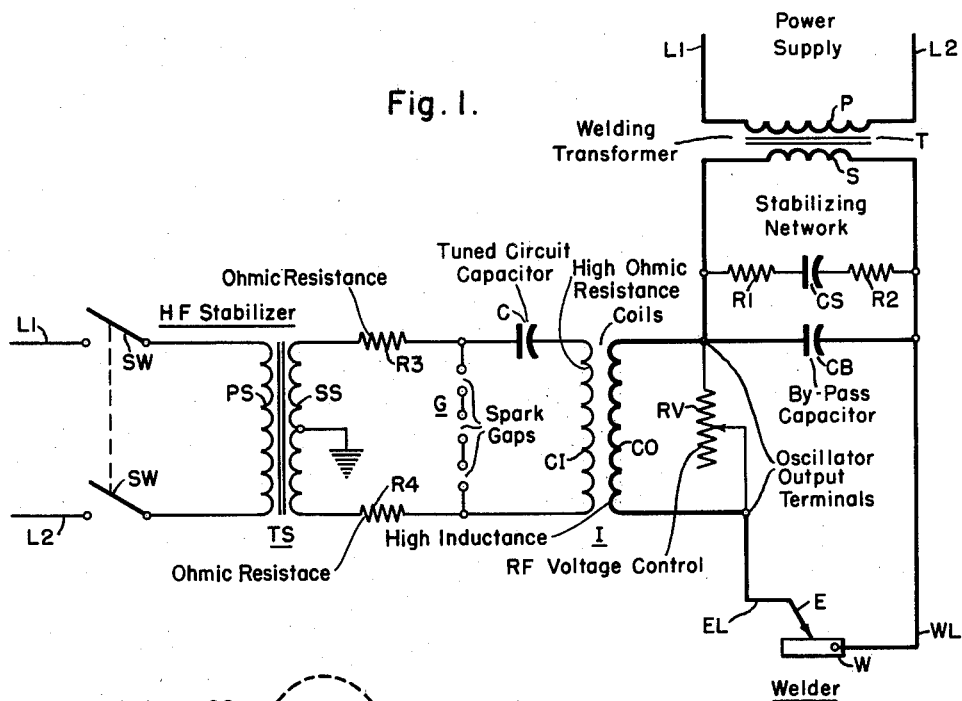
Figure 1 is a circuit diagram of a preferred embodiment of our invention.

The apparatus shown in Fig. 1 includes a welder and a high-frequency stabilizer. This apparatus is supplied with power from buses or conductors L1 and L2 which may be the buses of a commercial power supply of 220 or 440 volts or other voltage.

The welder includes welding electrode E and work W connected, respectively, to an electrode conductor EL and a work conductor WL. The electrode and the work are supplied from the buses or conductors L1 and L2 through a welding transformer T having a primary P and secondary S. The secondary S is capable of delivering to the electrode conductor EL and the work conductor WL power for welding at a convenient potential; for example, 70 volts and at the frequency of the power supply usually of the order of 60 cycles. One terminal of the secondary S is connected directly to the conductor WL and the other terminal is connected to the conductor EL through the output coil CO of a high-frequency stabilizing circuit. A variable resistor RV is connected across the output coil CO. This resistor may be adjusted to set the magnitude of the high-frequency potential impressed across the electrode conductor EL and work conductor WL. A stabilizing network consisting of a capacitor CS in series with a pair of resistors R1 and R2 is connected across the secondary S. A by-pass capacitor CB for by-passing the high-frequency from the stabilizer and preventing it from flowing through the transformer T is also connected across the secondary S.

The high-frequency stabilizer includes a step-up supply transformer TS having a primary PS and a secondary SS. The open-circuit voltage at the secondary SS is of the order of 8,000 to 10,000 volts and has the frequency of the commercial supply. The primary PS is connected to the conductors L1 and L2 through suitable circuit breakers or switches SW.

The high-frequency stabilizer also includes a resonant network consisting of a capacitor C and the coupled coils I, an air core transformer consisting of the output coil CO and the input coil CI, which in effect constitutes an inductance. The capacitor C and the input coil CI are connected in series with the secondary SS of the high-voltage transformer through a pair of resistors R3 and R4. A plurality of spark gaps G are connected in series between the junction of the capacitor C and one of the resistors R3, and the junction of the input coil CI and the other resistor R4. The resistance of the resistor is so related to the capacity C that the capacity charges at a rate such that the spark gaps have adequate time to deionize between succeeding trains of oscillation. The resistance is also so adjusted that the number of trains of oscillations is particularly effective to facilitate the starting, and stabilization, of an arc.

In apparatus such as shown in Fig. 1, which we have found to operate satisfactorily, the following components were included:

High voltage transformer TS—Westinghouse Electric Corporation transformer, style No. 1292587, with the magnetic shunt blocks removed to reduce the impedance.
Resistors R3 and R4 in series between resonant network and the secondary SS—125,000 ohms each.
Capacitor C in resonant network—.001 microfarad (mica capacitor).
Input coil CI—18 turns of .020 inch diameter, Nichrome wire, coil diameter 2⅜ inches, coil length 3 inches.
Output coil CO—21 turns, 2 layer standard copper tubing ½ inch outside diameter by ⅜ inch inside diameter; coil 5⁵⁄₁₆ inches, outside diameter 8¼ inches, length 7½ inches.
By-pass capacitor CB—.25 microfarad.
Capacitor CS in stabilizing network—8 microfarads.
Resistors R1 and R2 in stabilizing network—1 ohm each.
R. F.-voltage control—300 ohm resistive impedance, 106 ohms inductive impedance, 1150 ohms total impedance.

Figure 2:
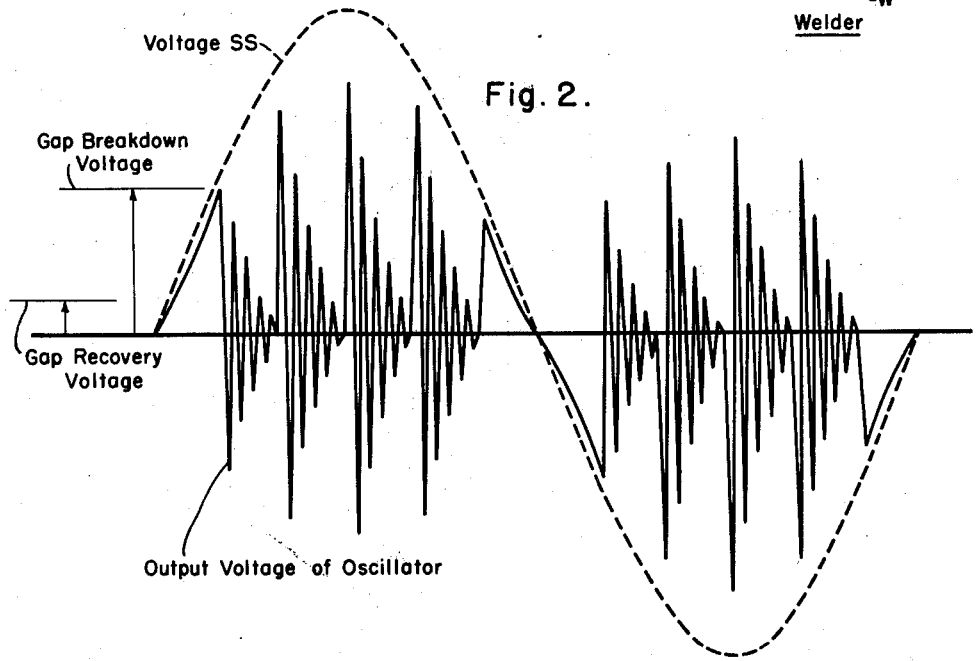
Fig. 2 is a graph showing the operation of the stabilizing oscillator of our invention.

In describing the operation of the apparatus, we shall refer to Fig. 2 which is a graph with voltage plotted vertically and time horizontally. The apparatus shown in Fig. 1 is set in standby condition ready for operation by closing the switch SW. Under such circumstances, a high voltage appears across the terminals of the secondary SS. This voltage is represented in Fig. 2 by the sine-wave curve which is in broken lines. At the beginning of a half-wave of potential from secondary SS, the spark gaps G are deionized and the voltage across the capacitor C rises at a rate determined by the charging of the capacitor C through the series resistors R3 and R4 and coil CI. This voltage is represented by the extreme2 left-hand branch of the full line curve. When this voltage reaches a magnitude equal to the spark gap breakdown voltage, the spark gap breaks down and the capacitor is immediately discharged and recharged to the opposite polarity through the spark gap and the coil CI. The voltage across capacitor C is then represented by the almost vertical line which extends from the left-hand bank to a negative point. The capacitor C then again discharges and recharges to the first polarity, the potential across the capacitor C being represented by the second almost vertical line on the left. This process is thereafter repeated, the capacitor C continuing to charge and discharge as represented by the series of the spikes which are formed by the almost vertical lines. Because there is resistance in the discharge circuit of the capacitor C, the charge on the capacitor is attenuated and the spikes are of gradually decreasing amplitude until the charge reaches so low an amplitude that the gaps can deionize. A wave train, as represented by the left-hand train of Fig. 2, is thus produced, and this damped wave train is reproduced across coil CI of the same magnitude and frequency but 180 degrees out in time phase.

At this point, the capacitor C is again charged through the resistors R3 and R4 and a second wave train represented by the second set of spikes from the left is produced by its charge and discharge through the spark gaps G. Because the resistors R3 and R4 are present in the charging circuit, the capacitor C charges at a rate determined by the resistors and the capacitor. The resistors R3 and R4 are of such magnitude that the rise of potential across the capacitor is at a sufficiently low rate to permit the spark gaps to deionize completely before the capacitor can be recharged from the 60 cycle source and thus permit the initiation of the second and subsequent wave trains.

Since the resistors R3 and R4 determine the rate at which the capacitor C is charged, they, in effect, determine the number of the wave trains per half period of the supply. The resistors do not determine the radio-frequency at which the charge and discharge of the capacitor takes place. This is determined by the capacity and the inductance in the resonant network and its mean magnitude is approximately equal to $$\frac{1}{2\pi\sqrt{LC}}$$

where L is the total inductance of the coil I, and C is the capacity of capacitor C.

In apparatus in accordance with our invention which we have constructed and operated successfully, the frequency of oscillations within each wave train has an average magnitude of the order of 1.6 megacycles.

The oscillating potential thus produced, and represented in Fig. 2, is impressed between the electrode conductor EL and the work conductor WL through the output coil CO and the by-pass capacitor CB. So long as the apparatus remains in stand-by condition, this potential is impressed as an open-circuit potential between the electrode E and the work W. When the operator brings the electrode E close to the work W, the high-frequency oscillator potential impressed between the electrode E and the work W becomes effective to ignite the welding arc betweeen the electrode and the work. The welding now proceeds with the stabilizing oscillator potential refiring the welding arc during each half period of the power supply from the conductors L1 and L2 when the potential passes through zero and the arc is extinguished.

We have found that the oscillator, as described herein, operates effectively to start and to stabilize the arc. We have made extensive measurements and have found that the radiation field from our welding apparatus is well within the limit established by the Federal Communications Commission.

Figure 3:
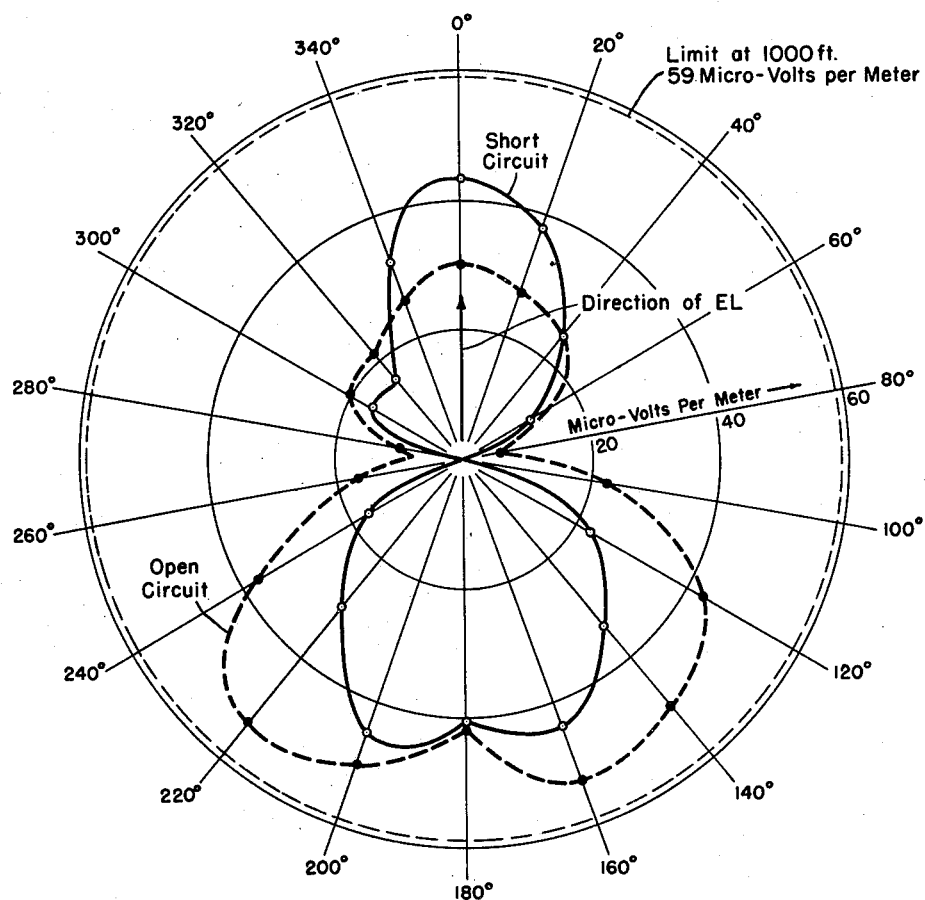
Fig. 3 is a polar diagram plotted from data taken with an arc welder in accordance with our invention.
Figure 4:
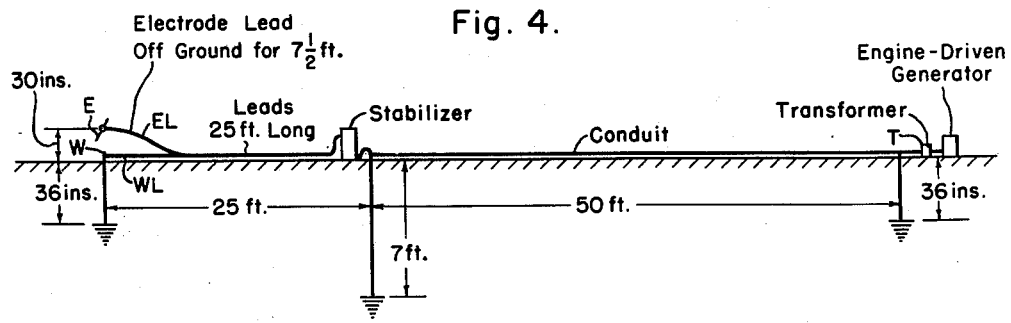
Fig. 4 is a diagram showing the arrangement of the parts of an arc welder in accordance with our invention, and the distances between the various components when our invention was used in producing the polar diagram shown in Fig. 3.

Fig. 3 represents a radiation pattern covering our measurements, and Fig. 4 shows the arrangement of the apparatus and the distances between the various components when the measurements were made.

In Fig. 3, signal strength in microvolts per meter from a source of radiation at the center of the plot, is plotted radially, and the angular position, with reference to the radius zero extending vertically upward from the center at which the measurement is taken, is plotted circumferentially. The lobe-like curves in Fig. 3 were plotted from measurements taken with welding apparatus according to our invention substantially at the center of a circle of 1,000 foot radius.

This apparatus is shown in Fig. 4 and includes an engine driven generator which supplies the transformer T. A conduit, 50 feet in length, was connected between the generator and the high-frequency stabilizer, and the welding lead, 25 feet in length, was connected between the stabilizer and the welding electrode. The work W and the work lead terminal at the stabilizer and the stabilizer case were grounded. With the electrode lead EL and the work lead WL along the zero radius, measurements were taken along the periphery of the 1,000 feet circle with the apparatus open-circuited and the oscillator operating at full power and also with the welding electrode short-circuited to the work W and the oscillator operating at full power.

On the chart (Fig. 3), the open-circuit operation is presented by the broken line lobes and the short-circuit operation by the full line lobes. As shown, the maximum radiation was measured with the measuring equipment displaced about 160° and 220° with reference to the electrode leads EL and the apparatus open-circuited. These maxima were about 52 microvolts per meter and are well within the Commission's limit. The short-circuit operation was also well within the Commission's limit.

For comparison a similar pattern for prior art apparatus is shown in Fig. 5. In this case, three lobe-like curves are presented, one in broken lines, derived from data taken with the welding apparatus open-circuited and the oscillator operating at full power, another in dot-dash lines, derived from data taken with a vertical antenna while welding with 100 amperes direct current, and the third in full lines taken derived from data taken with a loop antenna while welding with 100 amperes direct current. It is seen that while curve at open-circuit the prior art apparatus operates within Federal Communications Commission limits, the operation while welding far exceeds these limits.

We have then provided, in accordance with our invention, an arc welder with a high-frequency stabilizer which operates within a limit of 10 microvolts per meter at one mile away, and which, in addition, includes an oscillator in which the spark gaps are maintained stable and have a long life.

It may be well at this point to summarize the foregoing discussions and present in brief outline the problems involved in our invention, and the essential features of our invention. The two most important conditions of operation which must be considered in an arc welder including a high-frequency stabilizer is, as far as radiation is concerned, the open-circuit condition of the apparatus when a high radio-frequency voltage is impressed between the electrode and the work and the condition during welding when the high-frequency circuit may be considered as including a short from the electrode E to the work W. The radiation for prior art apparatus operating under open-circuit conditions with the high-frequency voltage at 2,000 and 3,000 volts does not exceed the limits at present established by the Federal Communications Commission. The radiation from the prior art arc welding apparatus including radio-frequency stabilizers under short-circuit or welding conditions far exceeds the Commission's limits.

The radiation when welding or when the electrode is short-circuited to the work is dependent directly on the radio-frequency current in the electrode conductor EL and the work conductor WL. To reduce radiation without sacrificing open-circuit voltage, it is desirable that the internal impedance of the high-frequency oscillator and of the welding circuit be high to minimize the radio-frequency current. In accordance with our invention, the following features were introduced to reduce the radio-frequency current and power.

(1) The inductance of the output coil CO was materially increased. This is accomplished by increasing the number of turns and changing the dimensions of the coil. It could also be accomplished by including magnetic core materials in the field of the coil CO.

(2) The oscillator capacitor C was reduced substantially. The prior art capacitor has a capacity of the order of .003 microfarad, and the capacitor in our apparatus has a capacity of the order of .001 microfarad. The ratio of the inductance to the capacity in the oscillator circuit was thus increased, and the generated power per wave train was reduced.

(3) The average high-frequency power put out through the arc welding apparatus was reduced by properly setting the number of wave trains by adjusting by means of the resistors R3 and R4 in series with the capacitor C the charge time of the capacitor.

(4) High radiation in a narrow band of frequencies was converted into substantially lower radiation over a wider band by decreasing the Q of the high-frequency oscillator, and specifically by providing the input coil CI of turns composed of a relatively high resistance wire, such as Nichrome wire. The Q could also be reduced by introducing magnetic losses instead of ohmic losses; for example by providing the coupling transformer I with a powdered iron magnetic core. Conceivably the Q could also be reduced by introducing dielectric losses in the capacitor C.

(5) The high-voltage transformer TS was converted from a high-impedance to a low-impedance transformer by removing its magnetic shunts and as a result, the compensating phase shifting networks of the prior art apparatus was eliminated.

(6) A resistor was introduced across the output coil CO to control the magnitude of the radio-frequency voltage so that it may be properly set. A variable reactance in this position would serve the same purpose and would have the advantage that it would permit tuning of the electrode conductor circuit which would, in turn, under certain circumstances, result in an increase in the radio-frequency voltage at the electrode holder. A similar object may be accomplished by varying the coupling between the coils CO and CI.

While we have shown and described certain specific embodiments of our invention, many modifications thereof are possible. For example, as is the practice frequently, the apparatus may include relay facilities for maintaining the voltage between the electrode E and the work W low until the welding is started, and for energizing the high-frequency oscillator when the operator energizes the electrode E and the work W. Our invention, therefore, is not to be restricted except as may be necessitated by the spirit of the prior art.

We claim as our invention:

1. A spark gap oscillator comprising a pair of terminals for supplying a potential; a spark gap; resistance means; means for connecting in series said terminals, said spark gap and said resistance means; said terminals being adapted to supply a potential sufficient to break down said gap; capacitive means; inductive means; and means for connecting said capacitive and inductive means in series across said spark gap, that said resistive means being of such resistance that the rate of charging of said capacitive means through said resistive means when the gap becomes non-conducting after a train of oscillations is so low as to permit the gap to deionize between successive discharges.

2. A spark gap oscillator having a low Q and including inductive means and capacitive means characterized by inductive means including at least one coil the turns of which are composed of Nichrome wire.

3. A spark gap oscillator comprising a pair of terminals for supplying a potential; a spark gap; resistance means; means for connecting in series said terminals, said spark gap and said resistance means; said terminals being adapted to supply a potential sufficient to break down said gap; capacitive means; inductive means; and means for connecting said capacitive and inductive means in series across said spark gap, the said inductive means including at least one coil, the turns of which are composed of Nichrome wire.

4. In combination, an arc welder including power supply means, an electrode conductor, and a work conductor; a spark gap oscillator having an output coil; and means connecting in a series network said power supply means, said electrode conductor, said work conductor, and said coil, said combination being characterized by the fact that said coil has a high reactance so as to maintain the oscillator current flowing through said network as low as practicable.

5. In combination, an arc welder including power supply means, an electrode conductor, and a work conductor; a spark gap oscillator having an output coil; and means connecting in a series network said power supply means, said electrode conductor, said work conductor, and said coil, said combination being characterized by the fact that said coil has a high reactance so as to maintain the oscillator current flowing through said network as low as practicable, and variable impedance means in parallel with said coil for setting the magnitude of the radio frequency voltage produced by said oscillator across said coil.

6. In combination, an arc welder including power supply means, an electrode conductor and a work conductor; a spark gap oscillator having output terminals; and means for connecting in a series network said power supply means, said electrode conductor, said work conductor, and said output terminals; said combinations being characterized by the fact that said oscillator has as high an output impedance as practicable.

7. In combination, an arc welder including power supply means, an electrode conductor and a work conductor; a spark gap oscillator having output terminals; and means for connecting in a series network said power supply means, said electrode conductor, said work conductor, and said output terminals; said combinations being characterized by the fact that said oscillator has as high an output impedance as practicable, said oscillator having primary and secondary output coupling coil means, the secondary coil means supplying the output terminals and having turns composed of copper wire and the primary coil means having turns composed of Nichrome wire.

8. In combination, an arc welder including power supply means, an electrode conductor and a work conductor; a spark gap oscillator having output terminals; and means for connecting in a series network said power supply means, said electrode conductor, said work conductor, and said output terminals; said combinations being characterized by the fact that said oscillator has as high an output impedance as practicable, the internal impedance and the Q of said oscillator being such that with the open-circuit potential impressed by said oscillator between said electrode conductor and said work conductor adequate to stabilize a welding arc, the signal radiated from the welder, when a low resistance of the order of the resistance of a welding arc is present between said electrode conductor and said work conductor, at any point on a circle of radius 1000 feet having its center substantially at the welder is less than 59 microvolts per meter.

9. In combination, an arc welder including power supply means, an electrode conductor, and a work conductor; a spark gap oscillator having an output coil; and means connecting in a series network said power supply means, said electrode conductor, said work conductor, and said coil, said combination being characterized by the fact that said coil has a high reactance and a low resistance so as to maintain the oscillator current flowing through said network as low as practicable.

References Cited in the file of this patent

UNITED STATES PATENTS

| | | |
|---|---|---|
| 932,821 | Shoemaker | Aug. 31, 1909 |
| 2,310,015 | Agnew | Feb. 2, 1943 |
| 2,395,062 | Nielsen | Feb. 19, 1946 |
| 2,470,668 | White | May 17, 1949 |